July 12, 1932.  L. A. DORFF ET AL  1,866,631
MAGNETO OPTICAL DEVICE
Filed June 28, 1928
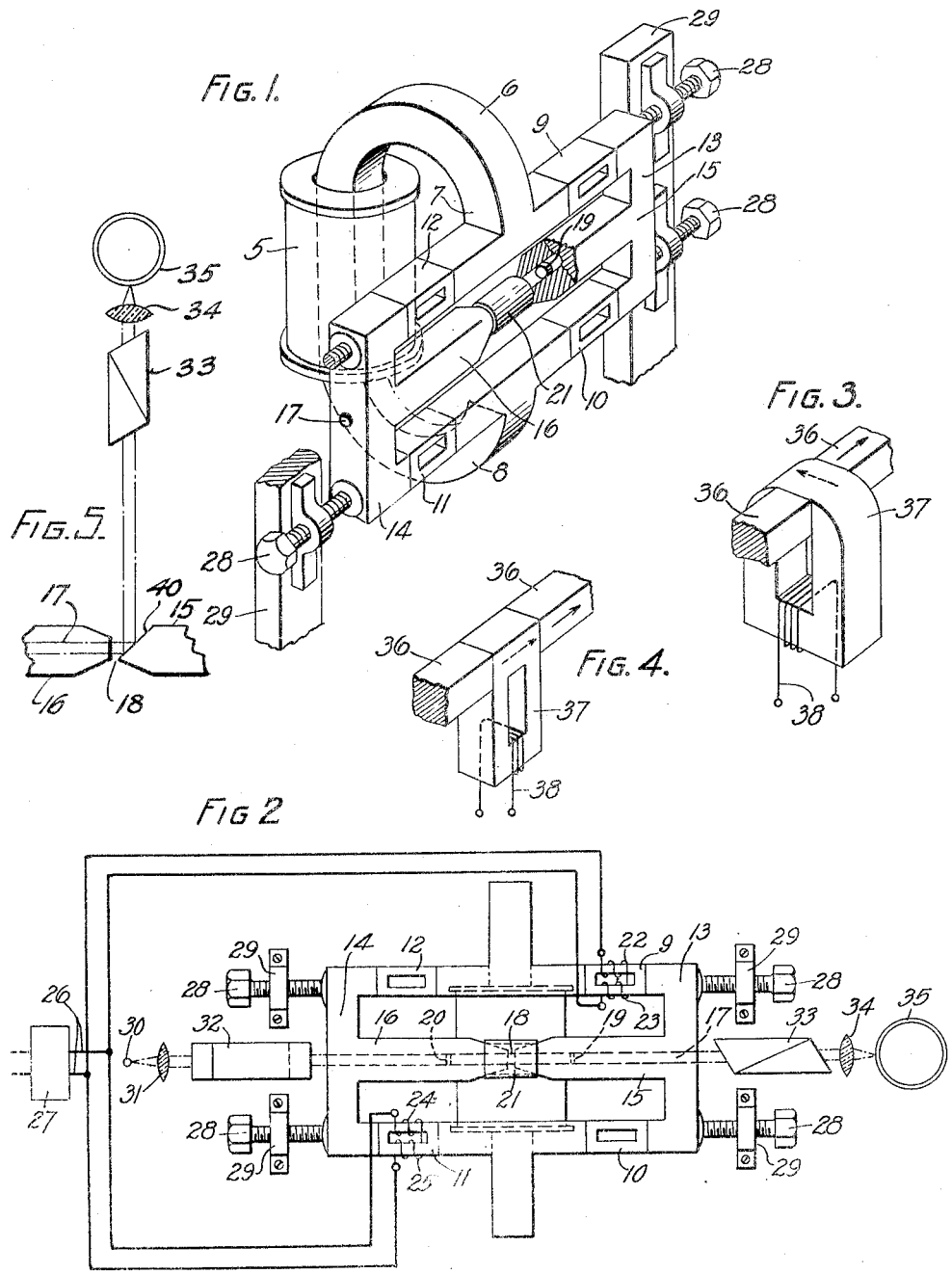
INVENTORS
LOUIS A. DORFF
GEORGE SANDALLS JR.
BY
ATTORNEY Patented July 12, 1932

1,866,631

UNITED STATES PATENT OFFICE

LOUIS A. DORFF, OF BLOOMFIELD, NEW JERSEY, AND GEORGE SANDALLS, JR., OF NORTH TARRYTOWN, NEW YORK, ASSIGNORS TO AMERICAN TELEPHONE AND TELEGRAPH COMPANY, A CORPORATION OF NEW YORK

MAGNETO-OPTICAL DEVICE

Application filed June 28, 1928. Serial No. 288,932.

This invention relates to magneto-optical devices.

In accordance with the present invention an improved magnetic structure is provided for controlling light by the utilization of the Faraday effect of magnetic rotation of the plane of polarization when plane polarized light traverses a transparent isotropic medium in the direction of the lines of magnetic force or the Kerr effect of changing plane polarized light to elliptically polarized light by reflection from the polished pole of an electro-magnet. In arrangements heretofore proposed it has been necessary in order to effect the light control to change the magnetic field by changing the current in a large magnetizing coil. Operation of such devices is limited by the fact that extremely high counter-electromotive forces are induced in the coil when the flux is varied at high speeds. The heavy currents and high potentials involved render such a device impracticable if an attempt is made to better the speeds obtainable with the well-known electro-mechanical light valves.

An arrangement illustrative of this invention comprises a magnetic structure wherein the variations in magnetic flux through the optical medium are produced, not by changing the magneto-motive force in the main flux source, but by changing the distribution of flux through a magnetic bridge, the flux from the flux source remaining substantially constant. This flux is swung from one path to another by the action of controlling units which act to upset the balance of the magnetic bridge by changing the permeability and reluctance of one or more of the bridge arms.

In a preferred arrangement of the invention a U-shaped electro-magnet is provided with laminated pole pieces which furnish two magnetic paths between the poles. A bridging magnetic path is provided between these two paths at points intermediate the poles of the U-shaped magnet by opposing extensions on the pole pieces of such size that a small gap is formed between them. A small hole is drilled through the pole pieces and extensions at right angles to this gap for the passage of a beam of polarized light produced by one Nicol prism and observed through a second. Within this hole, near the gap on either side are placed glass plugs and around the gap is a liquid tight tube, the closed vessel thus formed being filled with carbon bisulphid. A magnetic structure is thus formed which resembles a Wheatstone bridge, the U-shaped magnet corresponding to the battery supply circuit and the opposing polar extensions with the carbon bisulphid filled gap corresponding to the galvanometer circuit. Each bridge arm contains a permalloy section, two of which, in diagonally positioned arms, are control units and the other two are used to preserve symmetry in the bridge. The permeability of the control units is varied by amplified signal current to change the bridge balance which determines the flux through the gap and hence the intensity of the light beam emerging from the second Nicol prism.

A feature of the invention of more general application is an arrangement of pressure exerting means whereby pressure may be exerted on the magnetic material of a magnetically operated device to change the operating characteristics of the device and particularly on the bridge arms of a magnetic bridge to effect a balance by changing the magnetic properties of the metal constituting the bridge.

This invention is also useful for the control of radiant energy other than that ordinarily spoken of as light.

A more detailed description of the invention follows and is illustrated in the accompanying drawing.

Figure 1 is a perspective of one form of magnetic device embodying this invention;

Fig. 2 is a plan view showing an optical system and electrical circuits combined with the device of Fig. 1 for phototelegraphy;

Figs. 3 and 4 illustrate modified forms of control units.

Fig. 5 illustrates a modification of the polarized light controlling means.

Identical elements in the several figures are identified by the same reference characters.

Referring now to Figs. 1 and 2 of the drawing the magnetic structure is made of magnetic material so arranged that the magnetic circuit resembles that of a Wheatstone bridge. A large solenoid 5 is mounted on a U-shaped magnet 6 having poles 7 and 8. Between the poles 7 and 8 is a magnetic bridge arrangement comprising permalloy sections 9, 10, 11 and 12 and E-shaped sections 13, 14, the middle branches 15 and 16 of the E-shaped sections are juxtaposed to form a small gap 18 between their adjacent ends. The magnet 6 of this magnetic circuit is equivalent to the battery supply circuit of a Wheatstone bridge. The portions including the permalloy sections 9, 10, 11 and 12 are the bridge arms and the galvanometer circuit consists of the branches 15 and 16 and the gap 18 therebetween.

A small hole 17 is drilled through the pole pieces 15 and 16 to allow for the passage of a beam of light. Near the gap 18 within the hole 17 glass plugs 19 and 20 are inserted and around the gap is placed a liquid-tight tube 21.

The closed vessel thus formed is filled with carbon bisulphid, a transparent isotropic medium which, when placed in a magnetic field, acquires the property of rotating the plane of polarization when plane polarized light traverses the medium in the direction of the lines of magnetic force.

Two of the permalloy sections 9 and 11 located in diagonally opposite arms of the magnetic bridge are the control units. These sections are provided with small magnetizing windings 22, 23 and 24, 25, respectively. The windings on each section are connected in series opposing relationship with respect to the bridge arm in which it is located and the two control windings thus formed are connected in parallel to any suitable signaling circuit which may be the output circuit 26 of an amplifier 27. The other two permalloy sections 10 and 12 are used to keep the bridge structure symmetrical to facilitate balancing.

The adjusting screws 28 adjustable with respect to the framework 29 are arranged so that a longitudinal pressure may be exerted on each bridge arm to aid in balancing the bridge by reducing the air gaps between the various sections and by changing the magnetic properties of the metal constituting the bridge. The magnet 6 may be rigidly supported so that pressure may be exerted on the several bridge arms substantially independently of one another. A source of light 30 which may be an arc lamp and a lens 31 is arranged to transmit a beam of light through a light polarizer 32, which may be a Nicol prism and the hole 17 in the magnetic branches 15 and 16. Adjacent the other end of the hole 17 is an analyzer 33 which may also be a Nicol prism. Lens 34 is arranged to concentrate the light from the analyzer 33 on a picture receiving drum 35.

The operation of this device which may be called a light valve is as follows: A beam of light from the arc 30 passes through the lens 31 and the Nicol prism 32 so that the vibrations in the beam take place in only one plane upon emergence from the prism. The beam of polarized light passes through the hole 17 through the optical medium surrounding the gap 18 and out to the Nicol prism 33. If the analyzer 33 is set so that its plane is perpendicular to that of the polarizer 32 the light passed through the polarizer will be cut off by the analyzer. In this position the planes being perpendicular to each other, the prisms are said to be "crossed" and no light will be impressed upon the drum 35 from the lens 34, the device acting as though a shutter interrupted the beam. By turning the analyzer slightly from the crossed position light passes through it and its intensity increases as the analyzer is rotated until the planes of the prisms are parallel when it again decreases.

In order to accomplish the same effect that is obtained by rotating the analyzer without actually doing so, the plane of polarization of the beam can be rotated. This is equivalent to rotating the polarizer through a certain angle and hence light emerges from the analyzer. Such rotation may be accomplished by changing the magnetization within the optical medium in accordance with the well-known Faraday effect.

In the preferred arrangement with a no signal condition in the control units and the bridge in balance the flux at pole 7 has two parallel paths of equal reluctance to the pole 8. These paths are through sections 9, 13, 10 and 12, 14, 11. The branches 15 and 16 of the E-shaped sections are at equal magnetic potentials and no flux flows across the gap 18. The structure is so designed that a small change in the current of the control coils will upset the balance of the bridge. Due to the rapid change in the permeability of permalloy with small changes of magnetization as compared with other magnetic materials, it is possible for a small change of magnetization caused by a change of current in the control coils to make a decided change in the permeability of the permalloy sections 9 and 11. This changes the reluctance of the arms including these sections, upsetting the balance of the bridge and changing the magnetic potentials of the polar extensions 15 and 16, causing flux to flow across the gap 18. This difference in magnetic potential across the gap rotates the plane of polarization of the light beam in proportion to the difference in potential. Thus, by varying the current in the control coils the permeability of the permalloy is varied, changing the reluctance of the bridge arms including the sections 9 and 11, which varies the potential across the gap 18 and therefore controls the amount of light emerging from the analyzer and incident upon the recording drum 35.

The sections 10 and 12 may, furthermore, be so proportioned that the change in flux therethrough due to the upsetting of the bridge balance will change their permeability to further unbalance the bridge in the same direction.

The amount of light control is obviously dependent upon the magnetic condition of the various paths at all times and upon the optical medium in the gap 18. The matter of obtaining any desired effect is obviously a design problem.

In order to aid in arriving at the proper design the following information is supplied. The reluctance of the path including the branches 15 and 16 and the gap 18 should be as small as possible compared with the reluctance of the paths including the sections 9, 13, 10 and 12, 14, 11. The structure should be so designed that a change in flux density due to the unbalancing of the bridge will not materially change the permeability of the magnetic material, except for the permalloy elements. Furthermore, high field intensities in the gap 18 for small unbalances are desirable. The magnet 6 should be worked at or near saturation at all times, so that changes in the flux density will be only those due to changing the magnetic force. The solenoid 5 can be made as large as necessary as it is supplied from a local source of power and its inductance is not a function of the speed of operation of the valve. The flux in the magnet 6 should not change appreciably with an unbalance of the bridge.

The swinging of the flux from one path to another will involve certain losses. The bridge structure should therefore be laminated and may advantageously be constructed of compressed iron dust or laminated metal. The latter will probably be preferable due to the pressure to which it may be subjected by the adjusting screws 28.

In designing the control units several points should be considered. Preferably they should be of such a cross section that with no current in their coils, the magnetizing force due to the solenoid 5 would be that which gives maximum change of permeability for small changes of magnetizing force.

In the arrangement shown in Figs. 1 and 2, the control windings 22, 23 and 24, 25 are so wound on the control units 9 and 11, respectively, that no flux is produced in the magnet 6. For example, assuming such a direction of flow of current in winding 22 as will produce flux from left to right in the upper half of section 9, the direction of the flow of current in winding 23 will be such as to produce flux from right to left in the lower half of section 9. Thus, the flux produced by windings 22 and 23 is substantially confined to the section 9. The windings 24 and 25 are similarly arranged on section 11.

In order to further reduce the effective inductance connected in the output circuit of amplifier 27, the two pairs of windings 22, 23 and 24, 25 are connected in parallel to the output circuit 26.

Modified arrangements designed to eliminate interaction between the control flux in the control units and the main field flux from the magnet 6 are shown in Figs. 3 and 4. In Fig. 3 the control bridge arm corresponding for example to the upper right hand bridge arm of Fig. 2 is represented by the magnetic portions 36. The direction of the flux produced by magnet 6 may be represented by the solid arrow. The control unit consists of the permalloy section 37 in the form of a closed magnetic circuit having a control winding 38 surrounding a portion thereof. The direction of flux produced by the control winding 38 may be represented by the dotted arrow and is substantially at right angles to the main flux represented by the solid arrow. The amount of flux produced by the control winding 38 determines the permeability of the section 37, a portion of which is included in the path of the main flux and so determines the bridge balance.

The modification illustrated in Fig. 4 is similar to that of Fig. 3 except that the control flux is more nearly in the same direction as that of the main flux. In both Figs. 3 and 4 as well as in Figs. 1 and 2 there is some cross magnetization which enters in to determine the permeability of the control units.

In constructing the bridge the parts should be kept as symmetrical as possible. However, as mentioned hereinbefore unbalances can be compensated for by changing the pressure with the adjusting screws. The air gaps and thus the reluctances are therefore adjustable and the further effect of the mechanical stress on the magnetic properties of the material may be used to advantage. The effect of mechanical stress is to alter the susceptibility and other magnetic properties. The susceptibility is augmented by longitudinal compressive stress. Under high pressures the approach towards saturation is extremely rapid and the change from a highly susceptible state to an unsusceptible state is remarkably abrupt, as shown by J. A. Ewing in his book entitled "Magnetic induction in iron and other metals", 3rd Edition, Revised 1900, page 206. These effects in permalloy are especially large in comparison with the corresponding effects in hitherto available magnetic material, as pointed out by Messrs. Arnold and Elmen in a paper entitled "Permalloy, a new magnetic material of very high permeability", published in the Bell System Technical Journal, Vol. 2, No. 3, page 110.

The rotation of the plane of polarization is most pronounced with media having a high refractive index, such as bisulphid of carbon or dense flint glass. Films of iron with a thickness of about one-third of a wave length of light have given a rotation of over four degrees in a powerful magnetic field, while quartz plate one millimeter thick will give a rotation of about 20°, as explained by R. W. Wood in his book entitled "Physical optics", New and Revised Edition, 1911, page 501. However, there are many substances which will answer the purpose, but some are better than others from a practical viewpoint. Liquid carbon bisulphid is preferable because it is very clear and colorless and possesses the necessary rotatory property to a considerable extent.

The magneto-optic effect, discovered by Dr. Kerr, that when plane polarized light is reflected by a magnetic pole, the plane of polarization is turned through an angle which depends upon the intensity of magnetization, may also be used. Using the same bridge type of structure as hereinbefore described it is obvious that this effect may be used either singly or in combination with the Faraday effect in the construction of a light valve. Fig. 5 illustrates a modification of the polarized light controlling means shown in Figs. 1 and 2 using the Kerr effect. The arrangement shown in Fig. 5 may be substituted either for the middle branches 15 and 16 of the E-shaped sections 13 and 14 of Figs. 1 and 2 to use the Kerr effect singly, or may be inserted in the middle branch 15 to give a combination of the Kerr and Faraday effects. With these exceptions the apparatus used is identical with that illustrated in Fig. 2. During operation the light projected through path 17 strikes the polished surface 40 of the magnetic pole 15 and is reflected to the analyzer 33. Lens 34 is arranged to concentrate the light from the analyzer 33 onto a picture receiving drum 35 in the same manner as described with reference to Fig. 2.

The magneto-optical arrangement hereinbefore described may be used wherever it is desired to control radiant energy, and particularly light by electrical energy. Reference may be had to Patent No. 1,606,227, November 9, 1926 of Messrs. Horton, Ives and Long for a disclosure of a system in which this invention may be used, the arrangement of Fig. 2, for example, being substituted for the amplifier, electromechanical light valve and picture drum of Figs. 5 and 6 of that patent.

It is obvious that various other modified structures come within the purview of this invention and that the invention is only to be limited by the scope of the appended claims.

What is claimed is:

1. In a magneto-optical device, a magnetic bridge having four bridge arms arranged in series to form a closed magnetic circuit, means to produce a magneto-motive force between one pair of opposite corners of said bridge to cause flux to pass from one corner to the other in parallel paths, means to change the reluctance of at least one of said arms to cause a change in the magneto-motive force between the second pair of opposite corners of said bridge, a radiant energy path, and radiant energy controlling means in said radiant energy path controlled by the magneto-motive force between said second pair of opposite corners whereby a beam of radiant energy through said radiant energy path is controlled by the magneto-motive force between said second pair of opposite corners of said bridge.

2. In a magneto-optical device, a magnetic bridge having four bridge arms connected in series to form a closed magnetic circuit, means to produce a magneto-motive force between one pair of opposite corners of said bridge to cause flux to pass from one corner to the other in parallel paths, means to change the permeability of at least a portion of one of said arms to cause a change in the magneto-motive force between the second pair of opposite corners of said bridge, a radiant energy path, a source of radiant energy, and means controlled by the magneto-motive force between said second pair of opposite corners to determine the amount of radiant energy from said source traversing said radiant energy path.

3. In a magneto-optical device, a magnetic bridge having four bridge arms arranged in series to form a closed magnetic circuit, means to produce a magneto-motive force between one pair of opposite corners of said bridge to cause flux to pass from one corner to the other in parallel paths, means to change the reluctance of at least one of said arms to cause a change in the magneto-motive force between the second pair of opposite corners of said bridge, a source of plane polarized light, means controlled by the magneto-motive force between said second pair of opposite corners to rotate the plane of polarization of a beam of light coming from said light source, and means to transmit said light after rotation in accordance with the amount of rotation.

4. In a magneto-optical device, a source of plane polarized light, a magnetic bridge having four bridge arms arranged in series to form a closed magnetic circuit, and a bridging circuit between one pair of opposite corners of said bridge, magnetic means located in the path of light from said source for controlling the light, said magnetic means being located in the bridging circuit of said magnetic bridge, and means to change the flux in said bridge to control said magnetic light controlling means to change the nature of the magnetic control of the light.

5. In a magneto-optical device, a source of substantially constant flux, a source and path of radiant energy, two magnetic paths in parallel to said flux source, flux controlling means in one of said paths, and flux controlled means in the other of said magnetic paths for controlling the radiant energy in said path from said source, whereby a beam of radiant energy through said radiant energy path is controlled by said flux controlling means.

6. In a magneto-optical device, a source of substantially constant flux, a source and path of radiant energy, two magnetic paths in parallel to said flux source, a section of nickel-iron alloy in one of said paths, means to change the permeability of said nickel-iron alloy to control the flux in said path, and flux controlled means in the other of said magnetic paths for controlling the radiant energy in said path from said source, whereby a beam of radiant energy through said radiant energy path is controlled by said permeability controlling means.

7. In a magneto-optical device, a magnet, two magnetic bridges between the poles of said magnet, a polar extension on each of said bridges, said extensions extending toward each other and having a gap therebetween, means to control radiant energy in accordance with the flux in said extensions, and means to control the reluctance of at least one of said bridges to determine the flux in said extensions.

8. In a magneto-optical device, a magnet, two magnetic bridges between the poles of said magnet, a light transmitting path extending through both said bridges, flux controlled means in said light path for controlling the light in said path at a point between said bridges in accordance with the flux in said path, and means to control the reluctance of at least one of said bridges to control the flux in said light path to control said light controlling means.

9. In a magneto-optical device, a magnet, two magnetic bridges between the poles of said magnet, a polar extension on each of said bridges, said extensions extending toward each other and having a gap therebetween, means to control radiant energy in accordance with the flux in said extensions, a section of nickel-iron alloy in one of said bridges, and means to control the permeability of said section to control the flux in said extensions.

10. In a magneto-optical device, a magnet, two magnetic bridges between the poles of said magnet, a light transmitting path extending through both said bridges, flux controlled means in said light path for controlling the light in said path at a point between said bridges in accordance with the flux in said path, a section of nickel-iron alloy in one of said bridges, and means to control the permeability of said section to control the flux in said light path to control said light controlling means.

11. In a magneto-optical device, a magnet, two magnetic bridges between the poles of said magnet, a light transmitting path extending through both said bridges, flux controlled light controlling means comprising carbon bisulphid in said path at a point between said bridges for controlling the light in accordance with the flux in said path, the magnetic flux in said path being controlled by the reluctance of said bridges, and means to control the reluctance of at least one of said bridges to control the flux in said carbon bisulphid to control the light traversing said light path.

12. In a magneto-optical device, a U-shaped magnet, a magnetizing coil for said magnet, a magnetic bridge between the poles of said magnet, said bridge comprising sections of magnetic material on each side of each pole of said U-shaped magnet, said material being such that its permeability changes rapidly with small changes in magnetizing force, and E-shaped members on each side of said poles extending therebetween in series with said sections, the ends of the middle branches of the E-shaped members being juxtaposed to form a gap, a hole extending longitudinally through said branches to form a light passage, means to fill said gap with carbon-bisulphid, and means to change the permeability of at least one of said sections of magnetic material.

13. In a magneto-optical device, a U-shaped magnet, a magnetizing coil for said magnet, a magnetic bridge between the poles of said magnet, said bridge comprising sections composed of a nickel-iron alloy having high permeability at low magnetizing forces, and E-shaped members on each side of said poles extending therebetween in series with said sections, the ends of the middle branches of the E-shaped members being juxtaposed to form a gap, a hole extending longitudinally through said branches to form a light passage, means to fill said gap with carbon-bisulphid, and means to change the magnetization of at least one of said nickel-iron alloy sections to change its permeability.

14. In a magneto-optical device, a magnetic bridge having four bridge arms arranged in series to form a closed magnetic circuit, means to produce a magneto-motive force between one pair of opposite corners of said bridge to cause flux to pass from one corner to the other in parallel paths, means to produce a control flux local to one of said arms to change the permeability of at least a portion of said one arm to cause a change in the magneto-motive force between the second pair of opposite corners of said bridge, a radiant energy path, and radiant energy controlling means in said radiant energy path controlled by the magneto-motive force between said second pair of opposite corners whereby a beam of radiant energy through said radiant energy path is controlled by the magneto-motive force between said second pair of opposite corners of said bridge.

15. In a magneto-optical device, a magnetic bridge having four bridge arms arranged in series to form a closed magnetic circuit, means to produce a magneto-motive force between one pair of opposite corners of said bridge to cause flux to pass from one corner to the other in parallel paths, means to produce a control flux local to one of said arms and at a substantial angle to the flux produced by said magneto-motive force to change the permeability of at least a portion of said one arm to cause a change in the magneto-motive force between the second pair of opposite corners of said bridge, a radiant energy path, and radiant energy controlling means in said radiant energy path controlled by the magneto-motive force between said second pair of opposite corners whereby a beam of radiant energy through said radiant energy path is controlled by the magneto-motive force between said second pair of opposite corners of said bridge.

16. In a magneto-optical device, a magnetic bridge having four bridge arms arranged in series to form a closed magnetic circuit, means to produce a magneto-motive force between one pair of opposite corners of said bridge to cause flux to pass from one corner to the other in parallel paths, control windings for controlling the permeability of at least a portion of each of a plurality of said arms to cause a change in a magneto-motive force between the second pair of opposite corners of said bridge, a source of control current arranged to supply current to said control windings in parallel, a radiant energy path, and radiant energy controlling means in said radiant energy path controlled by the magneto-motive force between said second pair of opposite corners whereby a beam of radiant energy through said radiant energy path is controlled by the magneto-motive force between said second pair of opposite corners of said bridge.

17. In a magneto-optical device, a U-shaped magnet, a magnetizing coil for said magnet, a magnetic bridge between the poles of said magnet, said bridge comprising sections of magnetic material on each side of each pole of said U-shaped magnet, said material being such that its permeability changes rapidly with small changes in magnetizing force and E-shaped members on each side of said pole extending therebetween in series with said sections, the ends of the middle branches of the E-shaped members being juxtaposed to form a gap, a hole extending longitudinally through said branches to form a light passage, means to fill said gap with carbon-bisulphid, means to exert pressure on said sections of magnetic material and E-shaped members in a direction parallel to the flux produced by said magnetizing coil to partially determine the flux in said gap, and additional means to change the permeability of at least one of said sections of magnetic material to further control the flux in said gap.

18. In a magneto-optical device, a magnetic bridge having four bridge arms arranged in series to form a closed magnetic circuit, means to produce a magneto-motive force between one pair of opposite corners of said bridge to cause flux to pass from one corner to the other in parallel paths, means to change the reluctance of at least one of said arms to cause a change in the magneto-motive force between the second pair of opposite corners of said bridge, a source of plane polarized radiant energy, and radiant energy reflecting means in the path of radiant energy from said source controlled by the magneto-motive force between said second pair of opposite corners, whereby a beam of radiant energy striking said reflecting means has its plane of polarization changed in accordance with the magneto-motive force between said second pair of opposite corners of said bridge.

19. In a magneto-optical device, a U-shaped magnet, a magnetizing coil for said magnet, a magnetic bridge between the poles of said magnet, said bridge comprising sections of magnetic material on each side of each pole of said U-shaped magnet, said material being such that its permeability changes rapidly with small changes in magnetizing force, and E-shaped members on each side of said poles extending therebetween in series with said sections, the ends of the middle branches of the E-shaped members being juxtaposed to form a gap, the face of one of said ends being cut at an angle with respect to the other said end and polished to reflect light, a hole extending longitudinally through the branch, opposite said polished face, to form a light passage, the polished face branch being arranged to receive and reflect the light from said light passage, and means to change the permeability of at least one of said sections of magnetic material.

20. A magneto-optical device comprising two associated magnetic flux paths, flux controlling means in one of said paths for diverting varying amounts of flux therefrom to the second of said paths, an opening in the second of said paths, means for transmitting light through said opening, and means controlled by the flux in the second of said paths for variably controlling the transmission of light through said opening.

21. A magneto-optical device comprising two associated magnetic flux paths, pressure exerting means associated with one of said paths for initially preventing flux to flow in the second of said paths, flux controlling means in one of said paths for subsequently diverting varying amounts of flux therefrom to the second of said paths, an opening in the second of said paths, means for transmitting light through said opening, and means controlled by the flux in the second of said paths for variably controlling the transmission of light through said opening.

22. In a magneto-optical device, a magnetic bridge having four bridge arms arranged in series to form a closed magnetic circuit, means for supplying to said circuit a substantially constant amount of flux, means for exerting longitudinal pressure upon at least one of said bridge arms to control the distribution of said flux to balance said magnetic bridge, means to produce a magneto-motive force between one pair of opposite corners of said bridge to cause flux to pass from one corner to the other in parallel paths, means to change the reluctance of at least one of said arms to cause a change in the magneto-motive force between the second pair of opposite corners of said bridge, a radiant energy path, and radiant energy controlling means in said radiant energy path controlled by the magneto-motive force between said second pair of opposite corners whereby a beam of radiant energy through said radiant energy path is controlled by the magneto-motive force between said second pair of opposite corners of said bridge.

In testimony whereof, we have signed our names to this specification this 27th day of June, 1928.

LOUIS A. DORFF.
GEORGE SANDALLS, Jr.